United States Patent Office 2,735,216
Patented Feb. 21, 1956

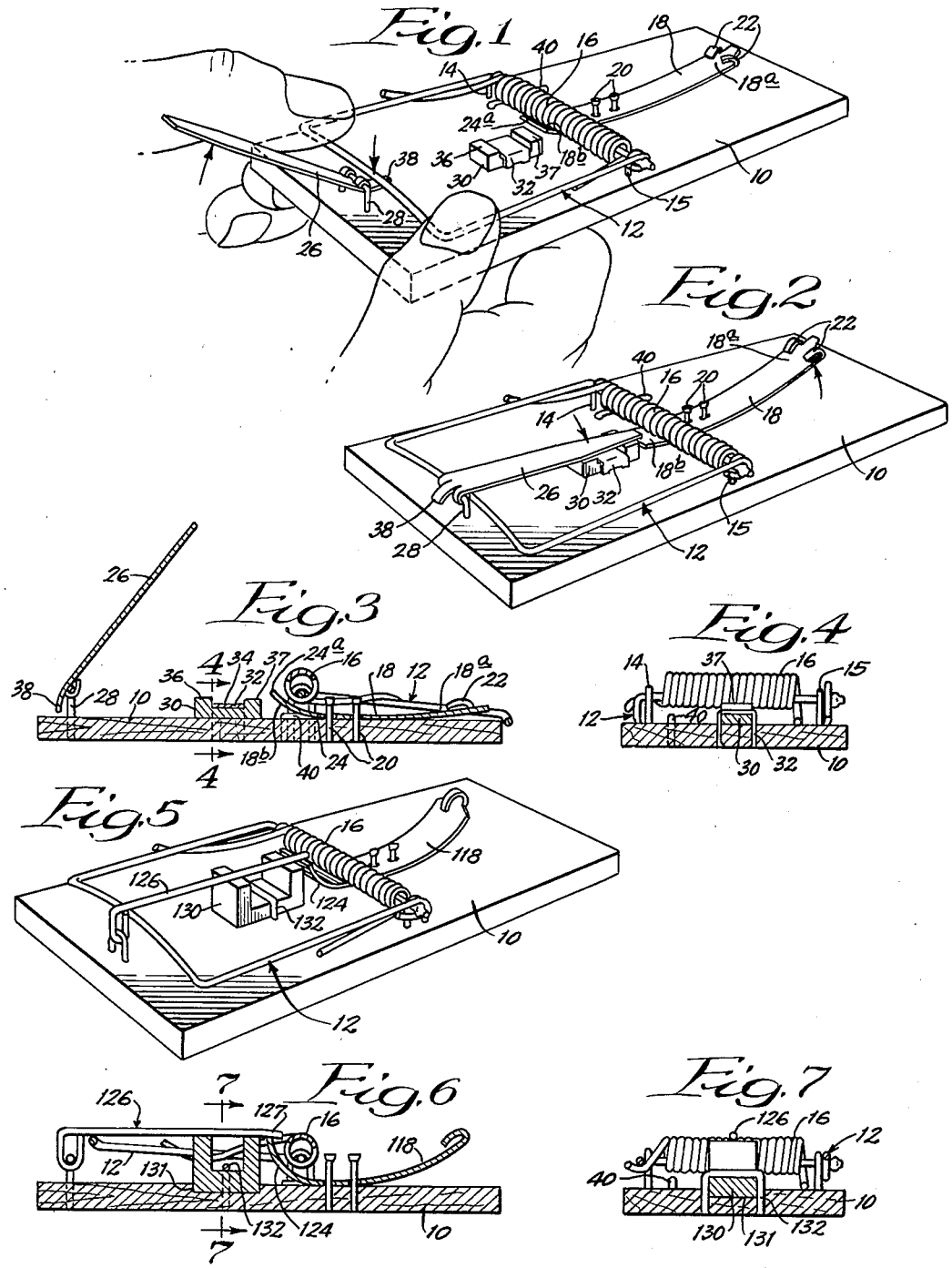

2,735,216

MOUSE TRAP

James H. Stebbins, Oelwein, Iowa

Application May 23, 1955, Serial No. 510,310

4 Claims. (Cl. 43—83.5)

This invention relates generally to an animal trap, and more particularly to a spring-powered mouse trap.

Prior forms of mouse traps employing a swingable striker and spring biasing means have depended upon a cocking of the striker against its spring bias by some form of mechanical latch means. The mechanical elements utilized for effecting latching have been characterized by an arrangement of levers providing a balance of entirely mechanical forces, and the manual cocking or setting of such traps has presented a physical hazard to the hands and fingers of the user. Means for minimizing such hazards in entirely mechanical constructions have necessarily sacrificed the delicate force balance which is essential to the "hair trigger" response so highly desirable for efficient trap operation.

It is the purpose of this invention, therefore, to provide a novel and improved form of animal trap construction which permits wholly safe manual cocking while providing an extremely delicate hair trigger response.

It is a primary object of this invention to provide a mechanical trap for mice and like animals employing magnetic latch means for retaining a striker in cocked relation against the bias of a power spring.

It is another object of this invention to provide a trap having latch means automatically actuated by manual cocking of the striker to effect setting without any necessity for the user to introduce his fingers in the path of the striker's trapping movement during latching.

It is a further object of this invention to provide a novel mechanical trap construction employing magnetic latch means for effecting hair trigger cocking of the striker.

With these and other objects in view, my invention consists in the construction, arrangement, and combination of the various parts of my mouse trap whereby the objects contemplated are obtained as hereinafter more fully set forth, pointed out in my claims and illustrated in the accompanying drawing, wherein:

Figure 1 is a perspective view of a trap constructed in accordance with the invention, and illustrating the manner in which the striker is manually withdrawn for effecting automatic latching of the striker in cocked relation;

Figure 2 is another perspective view, similar to Figure 1, showing the trap in set position preparatory to being tripped for performing a trapping action;

Figure 3 is a longitudinal cross-sectional view of the trap shown in Figures 1 and 2, showing the latch in an intermediate raised position;

Figure 4 is a transverse cross-sectional view taken substantially along the line 4—4 on Figure 3;

Figure 5 is a perspective view of a second embodiment constructed in accordance with the present invention, showing various parts in set relation preparatory to being tripped for performing a trapping action;

Figure 6 is a longitudinal cross-sectional view of the trap shown in Figure 5; and Figure 7 is a transverse cross-sectional view taken substantially along the line 7—7 on Figure 6.

Referring now more particularly to Figures 1 through 4 of the drawing, I have illustrated a first embodiment of a mouse trap constructed in accordance with the present invention. The trap comprises a base 10 of generally rectangular shape, formed from a relatively rigid sheet of wood, plastic, or similar low-cost material. A striker 12 is formed from a length of wire or metal rod bent back upon itself to provide a generally rectangular form defining a rear cross portion and a U-shaped forward portion including side arms and a cross arm. A pair of pivot loops 14 and 15 are embedded in the base 10 in generally parallel, spaced relation. The rear cross-portion of the striker 12 is adapted to extend through the pivot loops 14 and 15, and is of sufficient length so that the forwardly extending side arms of the striker are disposed outwardly of the loops. A power spring 16 is coiled about the striker's rear cross portion, and provides terminal lever portions at its opposite ends adapted to engage the base 10 and one of the forwardly extending side arms of the striker 12, respectively, for effecting a biasing of the striker in a forward direction with substantial force, in the conventional manner of mechanical trap constructions.

An actuator lever 18 is loosely mounted on the base 10 by means of a pair of mounting pins 20. The lever 18 is formed with a bait-receiving trip portion 18a at its forward end having suitable bait prongs 22 formed thereon. The lever 18 is of curved form from end-to-end, and provides a relatively sharp upturn 24 at its rear end which extends beneath the power spring 16 and defines a release portion 18b. The release portion of the lever 18 terminates in a flat release contact edge 24a which is raised and lowered relative to the plane of the base 10 when the lever 18 is rocked or pivoted about its area of contact with the base adjacent the mounting pins 20.

A latch lever 26, made of suitable magnetic material such as a ferrous metal and formed as a generally flat, elongated strip, is swingably carried by a pivot loop 28 embedded in the base 10 adjacent its rear end. The lever 26 is adapted to swing freely across the base 10, for positioning in forwardly overlying relation to retain the striker 12 in cocked relation, as will hereinafter be described in detail.

A permanent magnet 30 is fixedly secured to the base 10 by means of a mounting strip 32 extending across an intermediate recess 34 of the magnet 30. The top surface of the magnet 30 at opposite sides of the recess 34 defines a pair of flat engagement surfaces 36 and 37. The height of the surfaces 36, 37 above the base 10 is predetermined relative to the elevation of the forward end of the latch lever 26, when pivoted to its forwardly overlying position above the base 10, so as to permit the lever 26 to contactingly engage the surfaces 36, 37 and be fixedly held by the magnetic field thereof, as shown in Figure 2 of the drawing.

The normal height of the release contact edge 24a of the actuator lever 18 is slightly greater than that of the magnet surfaces 36, 37. The length of the lever 26 extends a sufficient distance beyond the magnet 30 when in its forward position of engagement therewith so as to overlie and contactingly engage the edge 24a of the actuator lever 18. When the latch lever 26 is lowered into engagement with the surfaces 36, 37 of the magnet 30, its forward end will engage the release contact edge 24a and effect lowering thereof to pivot the actuator lever 18 and thereby elevate its forward or trip portion 18a.

As best seen in Figures 1 and 3, the rear end of the latch lever 26 provides a flip tongue 38 which extends beyond the pivot loop 28. The tongue 38 is sufficiently short in length to permit its pivotal movement through the pivot loop 28 as the latch lever 26 is freely swung.

The tongue 38 cooperates with the forward cross portion of the striker 12 when fully retracted for effecting automatic pivoting of the latch lever 26 to its position of latched engagement with the magnet 30.

A bearing lift element 40 in the form of a staple or similar metal element provides an abutment above the surface of the base 10. The element 40 underlies the spring 16 adjacent the end thereof which provides a terminal lever portion adapted to engage a side arm of the striker 12. During retracting pivotal movement of the striker 12 against the bias of the power spring 16, there is a tendency for the spring to move downwardly into close engagement with the base 10. This movement is particularly pronounced at the spring end which provides the said striker-engaging lever portion. Since such movement might interfere with the free pivotal rocking of the actuator lever 18 upon the base 10, the bearing lift 40 is provided to engage the spring coils and prevent the spring from lowering at any time to such an extent as might interfere with the latching and releasing operation of the trap.

In practical operation, the user manually retracts the striker 12 from its forward position overlying a striking zone of the trap to a rearward position overlying a cocking zone thereof. As clearly shown in Figure 1, the trap is readily grasped by the fingers below the base 10, and by the thumbs above the corners of the striker 12. As the striker 12 is pivotally lowered toward a position of overlying engagement above the rear end of the base 10, its forward or striking cross-portion effects engagement with the flip tongue 38 of the latch lever 26 and effects a pivotal swinging of the lever 26, as shown by the direction arrows in Figures 1 and 2, forwardly over the base 10 and downwardly into engagement with the magnet 30. The magnetic force exerted by the magnet 30 upon the latch lever 26 is sufficient to pivot the actuator lever 18 so as to lower its release portion 18b and elevate its trip portion 18a, and to retain the striker 12 in cocked position against the bias of the power spring 16. The length of the latch lever 26 provides a sufficient lever arm multiplication of the force exerted by the magnet so as to effectively counter-balance the elevating force exerted by the power spring 16.

When a downward force is exerted upon the trip portion 18a at the forward end of the actuator lever, the lever will be pivoted so as to elevate the release contact edge 24a and thereby pivotally raise the forward end of the latch lever 26 out of the field of the magnet 30. The force of the power spring 16 is then free to pivotally swing the striker 12 upwardly and forwardly into trapping engagement with the base 10 at its forward end.

In Figures 5 to 7 of the drawing, I have shown a modified form of construction embodying several alternative structural features. The modified form of construction is essentially identical in its basic elements and mode of operation as the form of Figures 1 to 4. Identical parts have been given the same reference numbers in the two embodiments, and only the modified structural elements which differ from those of the embodiment of Figures 1 to 4 will be described.

An actuator lever 118 is provided in substantially the same manner as the lever 18 of the first embodiment, but is formed with a substantially deeper end-to-end curvature so as to position its release contact edge at a normal position of relatively high elevation above the base 10. A magnet 130 having substantially greater vertical height than the magnet 30 of the first embodiment, so as to provide contact surfaces above the level of the power spring, is embedded within a recess 131 formed in the base 10, and is fixedly secured in position by a wire staple or brad 132. In the first embodiment, the use of a mounting strip 32 of substantial width serves to preclude turning movement of the magnet 30 and thereby effects substantially rigid positioning thereof. For purposes of simplified and lower cost constructions, it may be desirable to employ staples such as 132 for mounting the magnet on the base. In such cases, it is desirable to dispose the magnet 130 in the suitable recess 131 so as to effect rigid positioning thereof.

In place of the strip form of latch lever 26 shown in the first embodiment, a metal rod or wire form of lever 126 may be utilized. A slight downbend 127 is provided at the forward end of the latch lever 126 to insure effective engagement with the release contact edge of the actuator lever 118. It will be apparent that a latch lever of substantial length may be utilized without risk of conflicting engagement with the power spring because of the substantial height of the magnet contact surfaces. The operation of the second embodiment is identical with that of the first embodiment, the exertion of a force at the forward end of the actuator lever 118 serving to effect pivoting thereof and elevation of the latch lever 126 out of engagement with the magnet 130, whereby the striker 12 is free to pivot upwardly and forwardly in response to the force of the power spring 16 for trapping action.

It will be apparent that I have provided a form of trap construction which permits hairtrigger operation without complex or hazardous mechanical latching, and which provides a safe and efficiently operating device of simple and low-cost construction.

Changes may be made in the construction and arrangement of the parts of my mouse trap without departing from the real spirit and purpose of my invention, and it is my intention to cover by the claims any modified forms of structure or use of mechanical improvements which may be reasonably included within their scope.

What I claim as new and desire to obtain by Letters Patent of the United States is:

1. An animal trap comprising a base, a striker mounted on said base for pivotal swinging movement thereacross, a power spring serving to bias said striker toward a position of overlying engagement against said base, an actuator lever pivotally mounted on said base, a magnet fixedly secured to said base, and a latch lever pivotally secured to said base and adapted to engage said magnet and be held thereby in a position for retaining said striker in cocked position against the bias of said power spring, said actuator lever when pivoted serving to move said latch lever away from said magnet and thereby release said striker for trapping movement.

2. An animal trap comprising a base, a striker mounted on said base for pivotal swinging movement thereacross from a cocking zone to a trapping zone, a power spring serving to bias said striker toward a position of overlying engagement against said base within said trapping zone, an actuator lever pivotally mounted on said base, a magnet fixedly secured to said base, and a latch lever having its one end pivotally secured to said base within said cocking zone and having its other end adapted to engage said magnet and be held thereby in a position for retaining said striker in cocked position within said cocking zone against the bias of said power spring, said actuator lever serving when pivoted to move said latch lever away from said magnet and thereby release said striker for trapping movement.

3. An animal trap comprising a base, a striker mounted on said base for pivotal swinging movement thereacross from a cocking zone to a trapping zone, a power spring serving to bias said striker toward a position of overlying engagement against said base within said trapping zone, an actuator lever pivotally mounted on said base and providing a trip portion within said trapping zone, a magnet fixedly secured to said base, and a latch lever having its one end pivotally secured to said base within said cocking zone and having its other end adapted to engage said magnet and be held thereby in a lowered position for retaining said striker in cocked position within said cocking zone against the bias of said power spring, said actuator lever providing a release portion adapted to underlie said latch lever and serving when pivoted by movement of said trip portion to raise said latch lever away from said magnet and thereby release said striker for trapping movement.

4. An animal trap comprising a base, a striker mounted on said base for pivotal swinging movement thereacross from a cocking zone to a trapping zone, a power spring serving to bias said striker toward a position of overlying engagement against said base within said trapping zone, an actuator lever pivotally mounted on said base, a magnet fixedly secured to said base, and a latch lever having its one end pivotally secured to said base within said cocking zone and having its other end adapted to engage said magnet and be held thereby in a position for retaining said striker in cocked position within said cocking zone against the bias of said power spring, said latch lever providing a portion extending beyond the pivot end thereof and adapted to be engaged by said striker when moved to its cocked position for automatically pivoting said other end into engagement with said magnet, said actuator lever serving when pivoted to move said latch lever away from said magnet and thereby release said striker for trapping movement.

References Cited in the file of this patent
UNITED STATES PATENTS 2,160,717    Booth  ---------------- May 30, 1939